United States Patent [19]

Petermann et al.

[11] Patent Number: 4,835,876
[45] Date of Patent: Jun. 6, 1989

[54] INSTRUMENT CHASSIS AND BODY SUPPORTS FOR PIPELINE SURVEY PIG

[75] Inventors: Steven G. Petermann, Plano; Michel L. Cabiran, Allen; John D. Cooper, Garland, all of Tex.

[73] Assignee: Atlantic Richfield Company, Los Angeles, Calif.

[21] Appl. No.: 67,511

[22] Filed: Jun. 26, 1987

[51] Int. Cl.[4] .................... E21B 47/022; G01C 9/06
[52] U.S. Cl. .................... 33/313; 33/178 F; 33/307; 33/304; 73/865.8; 73/866.5; 324/220
[58] Field of Search ............ 33/302, 304, 306, 307, 33/312, 313, 178 F, 542, 544; 73/865.8, 866.5, 151, 154; 324/220, 221

[56] References Cited

U.S. PATENT DOCUMENTS

| | | | |
|---|---|---|---|
| 1,921,522 | 8/1933 | Hamer | 33/178 F |
| 2,746,162 | 5/1956 | Picard | 33/312 |
| 4,098,126 | 7/1978 | Howard | 33/178 F |
| 4,285,242 | 8/1981 | Braithwaite | 324/220 |
| 4,372,658 | 2/1983 | O'Connor et al. | 324/220 |
| 4,468,863 | 9/1984 | Van Steenwyk | 33/304 |
| 4,524,324 | 6/1985 | Dickinson | 33/304 |
| 4,717,875 | 1/1988 | Lara | 33/313 |
| 4,747,317 | 5/1988 | Lara | 73/865.8 |

Primary Examiner—William A. Cuchlinski, Jr.
Assistant Examiner—Patrick R. Scanlon
Attorney, Agent, or Firm—Michael E. Martin

[57] ABSTRACT

A pipeline survey pig includes an elongated hollow pig body having an enclosure for supporting a generally cylindrical tubular instrument chassis which, in turn, supports an inertial reference unit and associated signal processing and recording devices. A plurality of resilient cup members support the pig body for traversal through a pipeline section under the urging of pressure fluid. The cup members are spaced apart and secured to the pig body by spacer members which may be selectively provided to predetermine the axial spacing of the cup members so that the center of stiffness of the pig is in a predetermined position. The instrument chassis is secured in the pig body by a cam mechanism which is actuatable from one end of the chassis after insertion into the pig body to wedge opposed chassis door members into engagement with the pig body to enhance heat transfer between the chassis and the pig body.

9 Claims, 5 Drawing Sheets

INSTRUMENT CHASSIS AND BODY SUPPORTS FOR PIPELINE SURVEY PIG

BACKGROUND OF THE INVENTION

1. Field of the Invention

The present invention pertains to a pipeline survey pig having a series of resilient cup support members which may be adjusted with respect to the pig body to selectively position the center of stiffness and a removable instrument chassis for the pig body for supporting an instrument cluster and power supply batteries.

2. Background

The adaptation of inertial type navigation instruments for use with pipeline survey pigs provides for accurate measurement of the curvature and displacement of pipelines due to subsidence and heaving of the earth on or in which the pipeline is supported. However, the packaging of the instrumentation, including the inertial reference unit and its power supply batteries, poses certain problems with regard to the physical arrangement of these components within the confines of a pig body structure and with regard to suitable heat transfer between the instrument components and the exterior of the pig body.

Another problem associated with a particularly unique pipeline survey pig concept using an inertial navigation unit pertains to providing for the center of stiffness of the pipeline pig and its support structure to be located coincident with or relatively close to the pig center of gravity. Although this is a desired feature, as described in co-pending U.S. Patent application Ser. No. 944,308 filed Dec. 18, 1986 and now U.S. Pat. No. 4,747,317 in the name of Pedro F. Lara and assigned to the assignee of the present invention, adjusting the location of the center of stiffness to a desired location in relation to the center of gravity, poses certain problems in the construction of the pig support structure.

The abovementioned problems associated with providing an improved pipeline survey pig have been addressed and overcome by the improved pig support structure and instrument chassis arrangement of the present invention.

SUMMARY OF THE INVENTION

The present invention provides an improved pipeline survey pig of a type utilizing onboard survey instrumentation such as an inertial reference unit which is capable of providing signals related to pipeline curvature and/or displacement from a predetermined course.

In accordance with an important aspect of the present invention, a pipeline survey pig is provided having a generally longitudinally extending body for supporting an instrument chassis, which body is supported by a plurality of spaced apart generally annular support cups. The support cups are connected to and spaced apart along the pig body by improved modular spacing and support structure which provides for positioning the support cups to provide a predetermined position for the center of stiffness of the pig structure when it is resting in a cylindrical pipeline or the like. The improved support and spacing structure is adapted for easy assembly and disassembly of the pig support cups or similar support structure so that the spacing of the support cups may be modified in accordance with the selected position of the center of stiffness.

In accordance with another important aspect of the present invention, there is provided a unique instrument support chassis for installation within a generally tubular pig body and adapted to support a plurality of instrument components and power supply batteries for operating an inertial reference unit and related data processing and storage components. The support chassis includes a unique locking mechanism which is adapted to lock the chassis within the tubular pig body in a predetermined position. The improved instrument support chassis is also adapted to provide suitable heat transfer from the instruments supported by the chassis to the pig body to minimize thermal loading on the instruments. The instrument chassis is adapted to substantially enclose and provide firm support for the instrument components and the power supply battery units while being of a generally cylindrical tubular configuration.

In accordance with yet another aspect of the present invention, there is provided a mechanism for securing a generally tubular instrument chassis within a cylindrical cavity formed in a pipeline pig body or the like whereby the instrument chassis is secured against rotation or movement relative to the body by a locking mechanism which moves opposed portions of the instrument chassis into frictional gripping engagement with the pig body wall. The locking mechanism is also adapted to positively release engagement of the instrument chassis from the secured position in the pig body for ease of removal of the instrument chassis from one end of the body.

Those skilled in the art will recognize the above described advantages and features of the present invention together with other superior aspects thereof upon reading the detailed description which follows in conjunction with the drawing.

DESCRIPTION OF PREFERRED EMBODIMENTS

In the description which follows, like parts are marked throughout the specification and drawing with the same reference numerals, respectively. The drawing figures are not necessarily to scale and certain features of the invention may be shown exaggerated in scale or in somewhat schematic form in the interest of clarity and conciseness.

Figure 1:
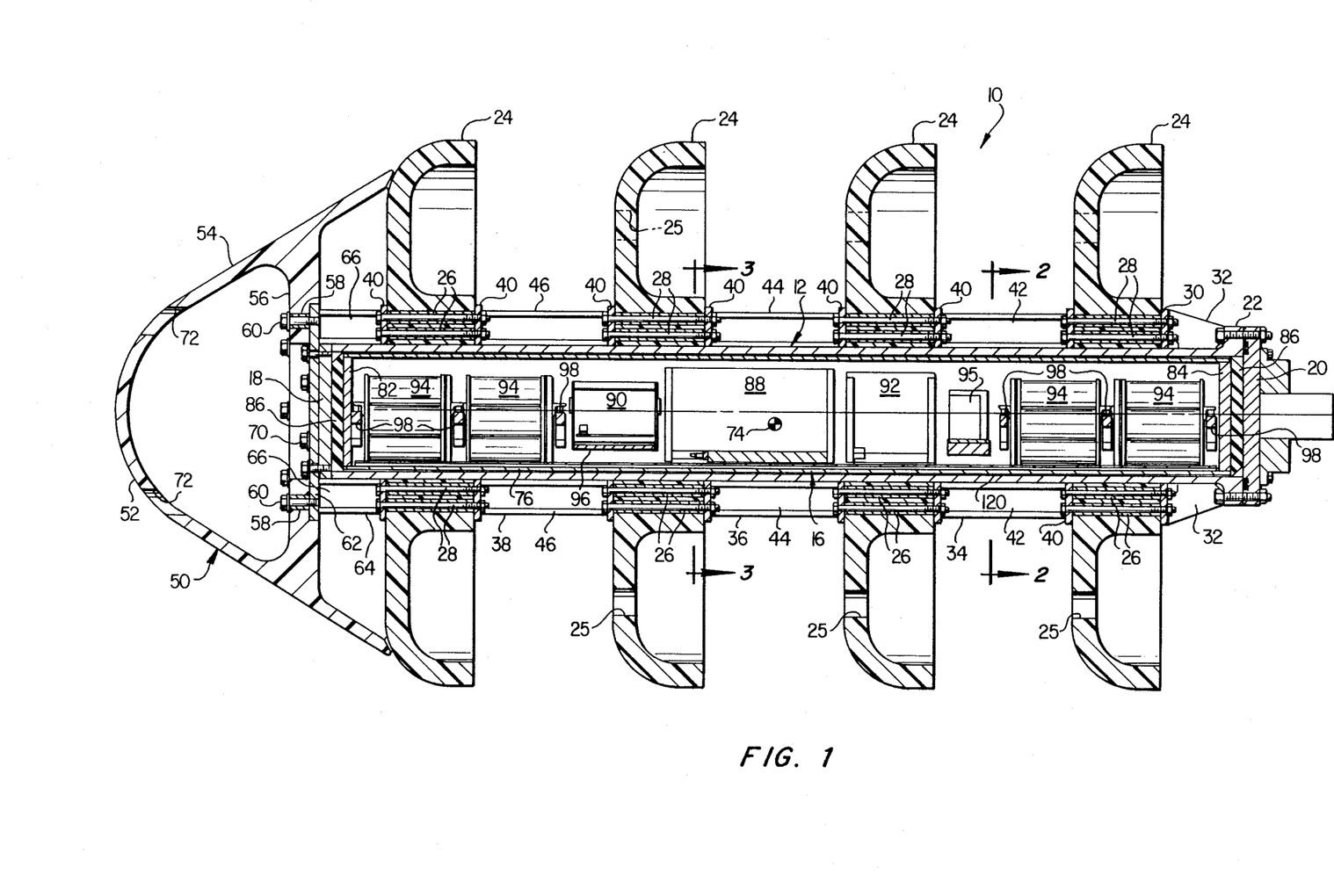
FIG. 1 is a longitudinal central section view of a pipeline survey pig in accordance with the present invention.

Referring to FIG. 1, there is illustrated a unique pipeline survey pig, generally designated by the numeral 10. The survey pig 10 is of a type which may be launched through a fluid transmission pipeline to conduct surveys of the course of the pipeline or any changes in course resulting from earth subsidence or heaving. The pig 10 is adapted to include the improved survey instrumentation disclosed in the above referenced patent application for sensing changes in curvature or lateral displacement of the pipeline and recording signals related to such changes or displacement. The survey pig 10 includes a longitudinally extending generally cylindrical body 12 defining an interior cavity which is substantially occupied by an instrument chassis, generally designated by the numeral 16. The body 12 includes a forward bulkhead 18 and a removable aft bulkhead 20 which is secured to the body at a transverse flange 22.

The pig 10 includes a plurality of generally cylindrical somewhat cup shaped support members 24 which are adapted to support the body substantially coincident with the longitudinal central axis of a pipeline section, not shown, through which the pig is to be propelled. The support members 24 are dimensioned to be in close fitting relationship with the inner wall surface of a pipeline section and to provide for propelling the pig through the pipeline by the urging of pressure fluid acting against the support members. The support members 24 are preferably formed of a molded polyurethane material and at least each of the three aft disposed support members is provided with plural openings 25 to allow circulation of pipeline fluid in the annular spaces between support members. Each support member 24 has molded in place plural elongated metal support sleeves 26 which are adapted to receive threaded fasteners 28 in the form of machine bolts. The support members 24 are spaced apart along the body 12 in sleeved relationship thereover. The aftmost support member 24 is secured to a flange 30 by a plurality of the fasteners 28. The flange 30 is suitably secured permanently to the body 12 and is braced by a plurality of gussets 32 interposed between the flange 30 and the flange 22. The spacing of the remaining three supports 24 is determined by plural spacer members 34, 36 and 38. Each of the spacer members 34, 36 and 38, includes a pair of opposed transverse flanges 40 and a plurality of interconnecting beam sections 42, 44 and 46, which are suitably secured to the flanges 40 circumferentially spaced apart as shown for the beams 42 in FIG. 2. The spacers 42, 44 and 46, and the support members 24 are secured together in axially stacked relationship by the plural fasteners 28.

The forward end of the pig 10 includes an impact nose 50 formed of a suitable resilient elastomer and having a generally bulbous forward portion 52 and a frustoconical fairing 54. An integral transverse flange portion 56 is provided with a plurality of sleeves or bushings 58 which are molded in place and are sufficiently rigid to provide for securing the impact nose 50 with fasteners 60 to a transverse plate member 62. The plate member 62 is part of a forward spacer 64 made up of a flange 40 and plural ones of beam sections 66 similar to the beam sections used with the spacers 42, 44 and 46. The plate 62 also is secured to the forward bulkhead 18 by plural fasteners 70. Access to the fasteners 60 is provided by suitable ports 72 formed in the impact nose 50.

The spacing of the support members 24 is critical to the desired performance of the survey instrumentation aboard the pig 10. It is preferred that the so-called center of stiffness, that is the point about which the tendency for the pig to deflect when supported by the support members 24 is equal in all directions, be located approximately coincident with the center of gravity of the pig 10 in order to minimize oscillations within the pipeline as the pig is traversing the line. Moreover, since the pig 10 is normally traversing a pipeline immersed in a relatively dense fluid, such as crude or refined petroleum, it is also preferable that the center of stiffness be located coincident with the center of buoyancy of the pig 10. Accordingly, depending on the type of instrumentation mounted within the chassis 16, it is highly preferable to have the center of stiffness 74 coincident with the center of buoyancy as indicated in FIG. 1. This may require a somewhat fine tuning of the pig by changing the position of the support members 24 with respect to the pig body 12. Thanks to the modular spacer members 34, 36 and 38, these members may be interchanged with members of different lengths or these members may be interchanged with each other to locate at least the two middle support members 24 at different positions relative to the forward and aft support members 24 so that the deflection characteristic or center of stiffness of the pig may be predetermined. The aft support member 24 may also be moved forward by interposing a short spacer, not shown, similar to the spacers 34, 36 and 38 between the flange 30 and the aft support member. Alternatively, flange members similar to the flanges 40 and characterized as shims, not shown, may be used to predetermine the exact location of each of the support members 24 relative to each other and to the pig body.

Figure 2:
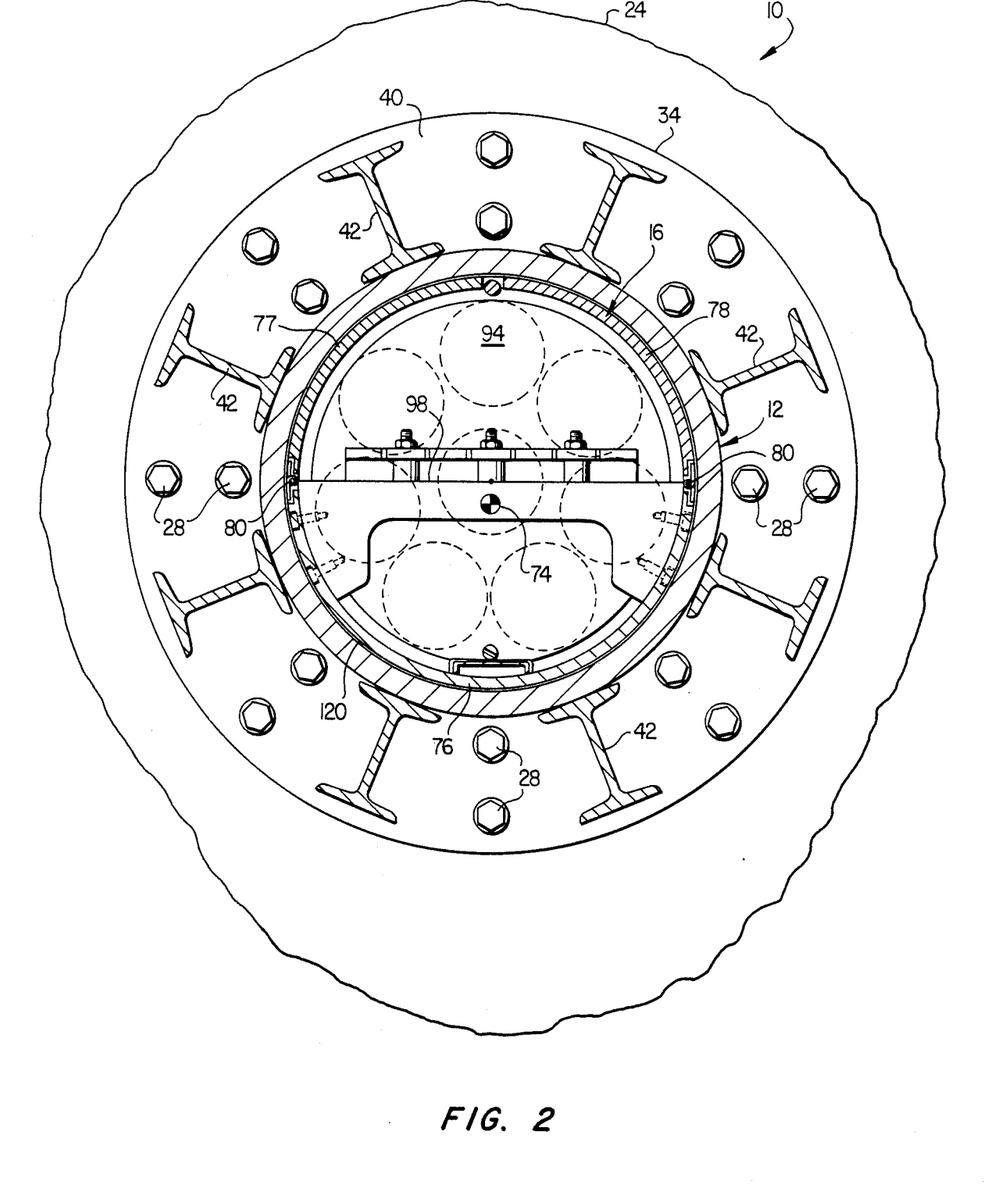
FIG. 2 is a section view taken substantially along the line 2—2 of FIG. 1.
Figure 3:
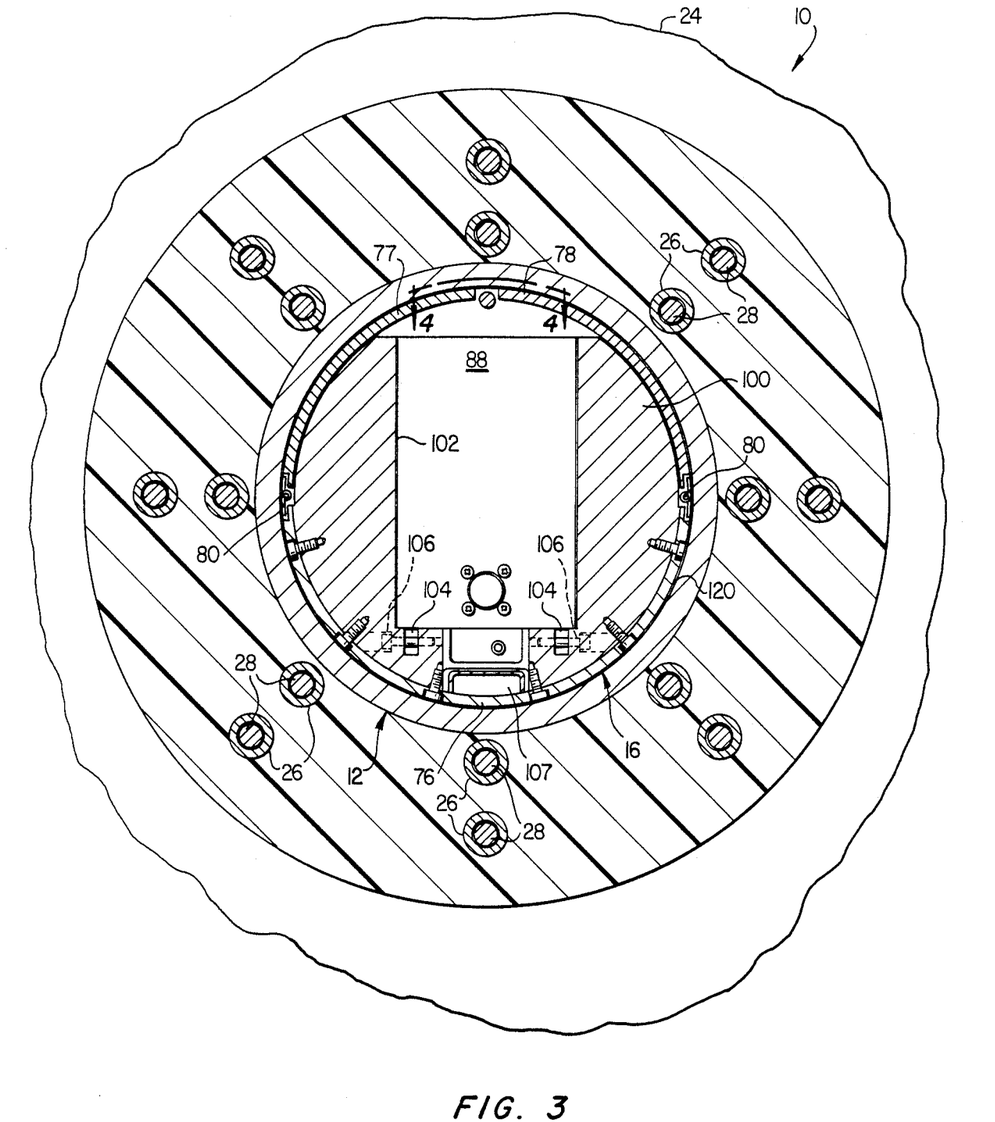
FIG. 3 is a section view taken substantially along the line 3—3 of FIG. 1.

Referring further to FIG. 1 and FIG. 2, the instrument chassis 16 is characterized by an elongated, generally semicylindrical tubular body member 76 having a diameter slightly less than the inside diameter of the body 12. The chassis 16 is adapted to form a substantially full cylindrical enclosure for various instruments which are mounted within the chassis, which enclosure is provided in part by opposed doors 77 and 78 which are hinged to the member 76 by suitable hinges 80, see FIGS. 2 and 3. In the closed position of the doors 77 and 78, as shown in FIGS. 2 and 3, a substantially cylindrical tubular structure is provided as the instrument chassis 16. Transverse endwalls 82 and 84, FIG. 1, are secured to the chassis body member 76 at opposite ends thereof and opposed resilient spacer members 86 secure the chassis 16 within the cavity formed by the body 12 to prevent longitudinal excursions of the chassis within the body.

Referring further to FIG. 1, major components of instrumentation disposed within the interior of the chassis 16 include an inertial guidance reference unit 88, a digital computer 90, a data recorder 92, a plurality of battery units 94 and a power converter 95. The computer 90 is mounted on a transversely extending support member 96 and the battery units 94 are each supported on spaced apart transversely extending support members 98, see FIG. 3, also. Certain ones of the instrument units disposed within the chassis 16 generate sufficient heat that must be dissipated through the instrument chassis and the body 12 to the fluid medium in which the pig is disposed during operation in a pipeline. Referring to FIG. 3, the inertial guidance unit 88 is supported in a heat conductive enclosure 100 which may be formed of aluminum, for example. The enclosure 100 defines a cavity 102 in which the unit 88 is secured by depending lugs 104 and suitable socket head fasteners 106, as shown in FIG. 3. A substantial portion of the mass of the enclosure 100 is contiguous with the member 76 and provides for substantial heat transfer from the unit 88 through the enclosure, the chassis 16 and the body 12 to the exterior surface of the body. A longitudinally extending wireway 107 runs through the enclosure 100.

The disposition of the chassis 16 within the body 12 and enhancement of the heat transfer capability for transferring heat from the chassis to the body 12 are provided by a unique locking mechanism to be described hereinbelow which secures the chassis 16 fixed against rotation or longitudinal movement within the body but provides for ease of removal and insertion of the chassis. The relatively long, slender configuration of the body 12 and the chassis 16 requires insertion of the chassis from the forward or preferably aft end of the pig by removal of the flange 20 so that access to the interior of the body may be obtained. The chassis 16 is preferably inserted in and supported within the body 12 with the assistance of a layer of heat transfer and lubricating material 120, see FIGS. 1, 2 and 3, of a type commercially available and known as a type LT400 Heat Transfer Composition manufactured by Yarway/Briskheat Corporation, Bluebell, Pa. The heat transfer composition 120 provides added contact between the member 76, the doors 77 and 78, and the interior surface of the body 12 and facilitates insertion of and removal of the chassis 16 with respect to the body.

Figure 4:
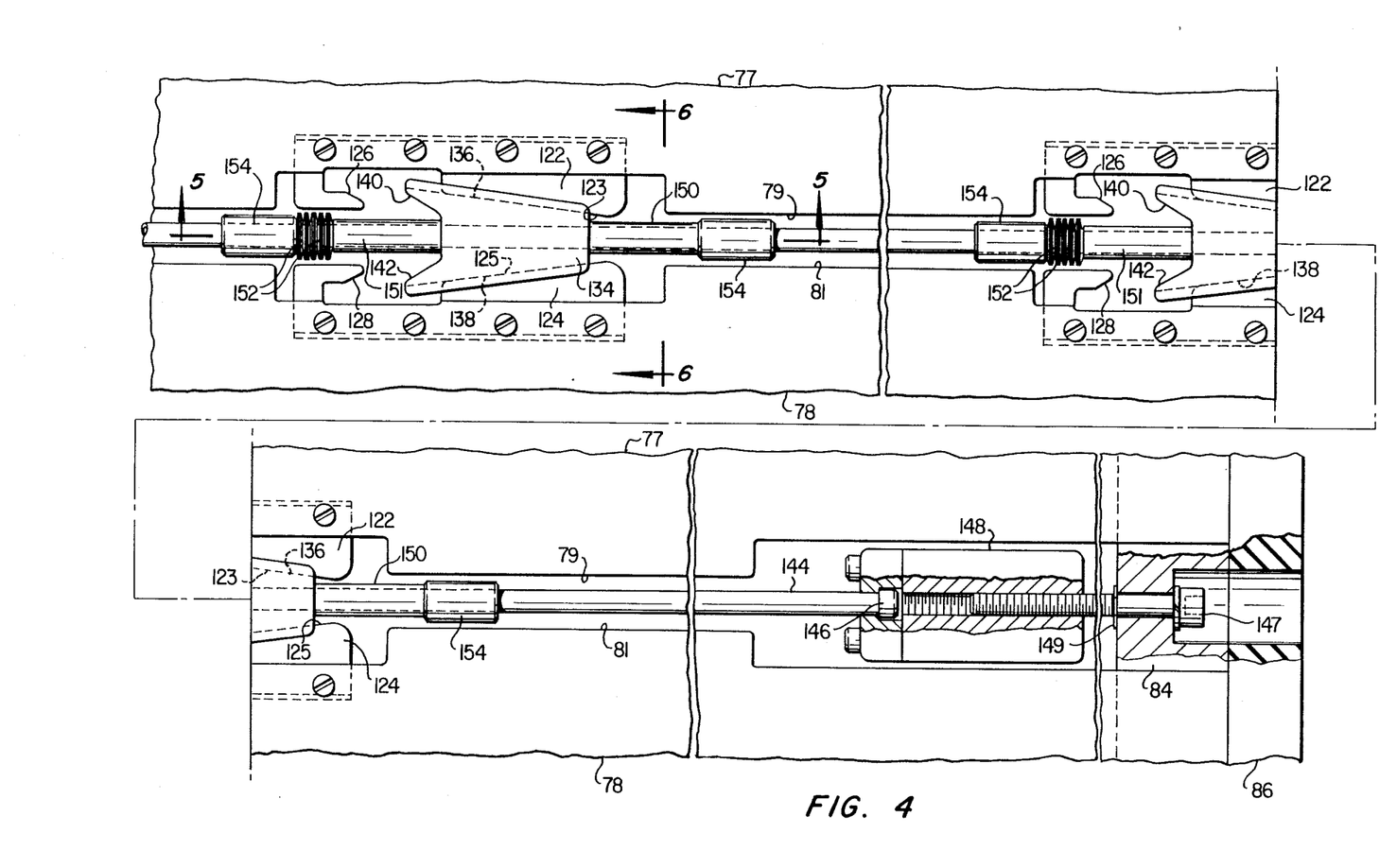
FIG. 4 is a detail view taken generally from line 4—4 of FIG. 3 and showing the locking mechanism for the instrument chassis.
Figure 5:
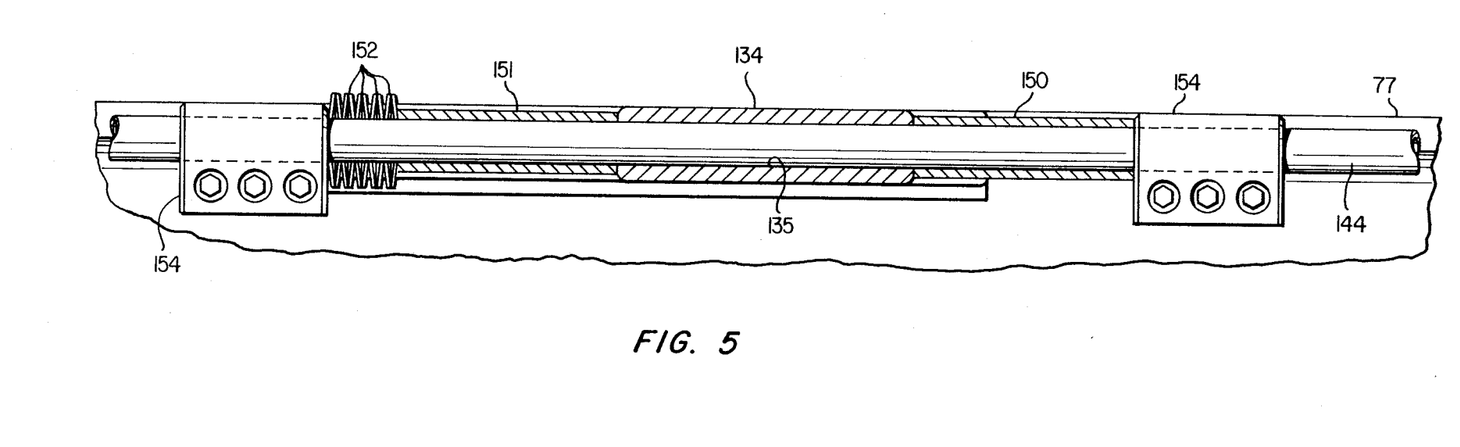
FIG. 5 is a detail section view taken generally along the line 5—5 of FIG. 4.
Figure 6:
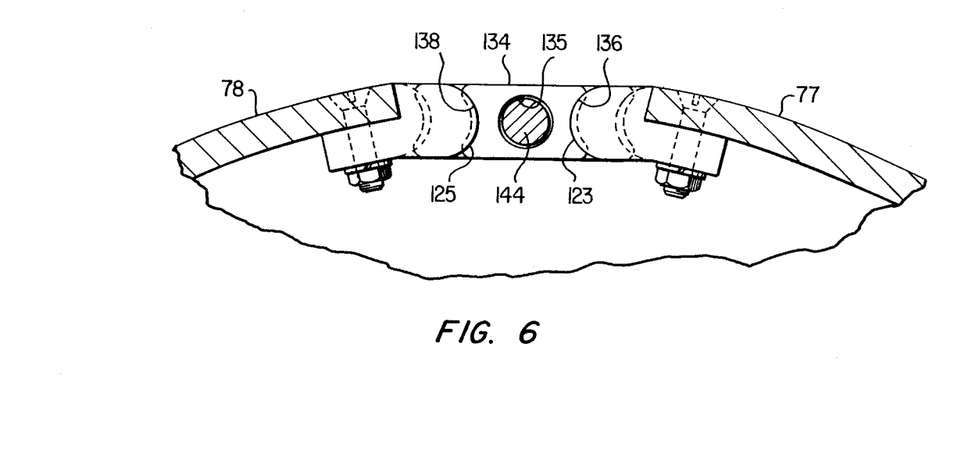
FIG. 6 is a section view taken along the line 6—6 of FIG. 4.

When the chassis 16 is inserted in the body 12 it is clamped or locked in position to assure large area contact of the chassis with the body through the heat transfer composition by the locking mechanism illustrated in FIGS. 4, 5 and 6. Referring to FIG. 4, each of the doors 77 and 78 is provided with plural longitudinally spaced apart cam follower members 122 and 124 which include opposed longitudinally diverging cam follower edges 123 and 125 and secondary cam follower surfaces 126 and 128 which are provided on longitudinally extending projections 127 and 129, respectively. At least two sets of cam followers 122 and 124 are provided spaced apart along the opposed edges 79 and 81 of the doors in suitably recessed portions of each, as illustrated in FIG. 4. The cam follower surfaces 123 and 125 are engageable by a somewhat wedge shaped cam 134 having opposed concave cam surfaces 136 and 138, respectively, for urging the doors 77 and 78 to pivot outwardly about their respective hinges 80 into forcible engagement with the inner wall surface of the body 12. The cams 134 also include opposed projections 140 and 142 which engage the cam surfaces 126 and 128 to move the doors 77 and 78 in an opposite direction or toward their respective closed positions so as to retract the doors away from the wall surface of the body 12 when it is desired to remove the chassis 16 from the body.

The cams 134 are adapted to be actuated by an elongated actuating rod 144 having a head portion 146 retained in a traveling nut assembly 148. The nut assembly 148 is threadedly engaged with a conventional bolt 147 which extends through a suitable opening in the chassis endwall 84 and is secured for rotation relative to the endwall by a suitable retaining ring 149. In response to rotation of the bolt 147, the nut 148 and the rod 144 are moved longitudinally to cause the cams 134 to urge the doors 77 and 78 to move outwardly or inwardly in accordance with which cam surfaces on the cams 134 are in engagement with the cooperating surfaces on the cam followers 122 and 124.

Referring primarily to FIG. 5, the rod 144 extends through a suitable bore 135 formed in each of the cams 134 and is slidable relative to the cams in order that more than one cam 134 may be actuated by the rod. Limited movement of the rod 144 relative to the cams 134 is provided by an arrangement of opposed sleeves 150 and 151 which are permitted limited axial excursion with respect to the rod 144 by a series of conical washer or bellville type springs 152 interposed between the sleeves 151 and a retaining collar 154 which is secured to the rod 144 for movement therewith. A second retaining collar 154 limits movement of the sleeve 150 relative to the cam 134. Accordingly, in response to rotation of the bolt to draw the rod 144 to the right, viewing FIG. 4, the rod 144 may move relative to the cams 134 while the cams exert a substantial wedging action against the doors 77 and 78 thanks to the retaining collars 154, the springs 152 and arrangement of the sleeves 150 and 151. Limited movement of the retaining collars 154 and the rod 144 relative to the cams 134 thus permits wedging all of the cams tightly.

In assembling the instrument chassis 16 into the interior of the pig body 12, the doors 77 and 78 are closed and the rod 144 is actuated to move the cams 134 into engagement with the respective cam surfaces 126 and 128 to assure that the doors are tightly held in the closed position to provide sufficient clearance for insertion of the chassis into the pig body with ease. A liberal coating of the heat transfer composition 120 is applied all over the exterior surfaces of the doors 77 and 78 and the chassis member 76 and the chassis is slid into the interior of the pig body with the flange 20 removed. After full insertion of the chassis into the pig body 12, the bolt 150 is rotated to effect actuation of the rod 144 to move to the right, viewing FIG. 4, disengaging the cam surfaces 126 and 128 and engaging the cams 134 with the cam surfaces 123 and 125 to wedge the doors 77 and 78 outwardly into forcible engagement with the interior wall of the pig body 12 through the layer of heat transfer composition. The action of the doors 77 and 78 being forced outwardly against the interior wall of the body 12 also forces the member 76 into engagement with the body through the layer of heat transfer composition 120 so that a large surface area is available for heat transfer from the chassis through the pig body 12 to the exterior of the pig 10.

When it is desired to remove the instrument chassis 16 from the pig body 12, the flange 20 is again removed and the rod 144 actuated through the nut 148 and bolt 150 to move the cams 134 to engage the cam follower surfaces 126 and 128 thereby retracting the doors away from engagement with the pig body so that the chassis 16 can be easily removed from the end of the body defined by the flange 22.

Although a preferred embodiment of the present invention has been described herein in detail, those skilled in the art will recognize that various substitutions and modifications may be made for the specific features of the invention described herein without departing from the scope and spirit of the invention as recited in the appended claims.

What we claim is:

1. A pipeline survey pig for determining the curvature or lateral displacement of a pipeline utilizing signals generated by an inertial reference unit mounted on said pig, said pig comprising:

an elongated pig body having an interior cavity defining a space for supporting an instrument chassis;

an instrument chassis adapted to be supported in said pig body and including an inertial reference unit for sensing changes in course of a pipeline representing curvature or lateral displacement of portions of said pipeline;

a plurality of support members for supporting said pig in a section of pipeline, said support members being spaced apart and supporting said pig body in said pipeline, said support members being adapted to permit limited lateral excursion of said pig body in said pipeline;

means for selectively positioning said support members longitudinally with respect to said pig body such that the center of stiffness of said pig is in a predetermined position relative to the center of buoyancy of said pig when said pig is disposed in a fluid in a section of pipeline;

support means for supporting said reference unit in said chassis, said support means including a metal block contiguous with a portion of said chassis for transferring heat from said reference unit to said pig body through said chassis, said chassis including an elongated chassis body member and means for securing said chassis body member in said pig body in forcible engagement with said pig body including a pair of opposed doors hinged to said chassis body member and means engageable with said doors for urging said doors to be moved into forcible engagement with said pig body and to prevent rotation of said chassis within said pig body and to improve the heat transfer capability of said chassis with respect to said pig body.

2. The survey pig set forth in claim 1 wherein:

said means for urging said doors into engagement with said pig body includes at least one cam engagable with cooperating cam follower surfaces formed on said doors; and cam actuating means engagable with said cam and operable from at least one end of said chassis for effecting engagement of said cam to force said doors into a position to engage said pig body.

3. The survey pig set forth in claim 2 wherein:

said cam includes means engagable with further cam follower surfaces secured to said doors, respectively, for effecting movement of said doors in a direction away from said pig body in response to actuation of said cam actuating means.

4. The survey pig set forth in claim 3 wherein:

said cam actuating means includes an elongated rod, means for moving said rod longitudinally to effect movement of said cam, and lost motion means for permitting movement of said rod relative to said cam so that said rod is operable to force first and second ones of said cams into engagement with said doors.

5. A pipeline pig comprising:

an elongated pig body having an interior cavity defining a space for supporting an instrument chassis; and an instrument chassis including an elongated chassis body member and means for releasably securing said chassis body member in said pig body in forcible engagement therewith to prevent rotation of said chassis within said pig body and to improve the heat transfer capability of said chassis with respect to said pig body, said means for releasably securing said chassis body member includes a pair of opposed members hinged to said chassis body member, said opposed members being engageable with means for forcing said opposed members to be moved into forcible engagement with said pig body when said chassis is inserted in said pig body.

6. The pig set forth in claim 5 wherein:

said means for forcing said opposed members into engagement with said pig body include at least one cam engagable with cooperating cam follower means on said opposed members, respectively; and cam actuating means engagable with said cam and operable from at least one end of said chassis for effecting engagement of said cam to force said opposed members into a position to engage said pig body.

7. The pig set forth in claim 6 wherein:

said cam includes means engagable with further cam follower means secured to said opposed members, respectively, for effecting movement of said opposed members in a direction away from said pig body in response to actuation of said cam actuating means.

8. A pipeline survey pig comprising:

an elongated generally cylindrical pig body having an interior cavity defining a space for supporting an instrument chassis;

an elongated instrument chassis including a chassis body member for supporting a plurality of instrument units therein and a pair of opposed doors hinged to said chassis body member and movable between open and closed positions; and actuating means operable from one end of said chassis body member for releasably securing said chassis body member in said pig body by actuating said doors to move into forcible engagement with said pig body when said chassis body member is located in said interior cavity, said means for securing comprising at least one set of opposed cam follower surfaces on said doors, respectively, an elongated actuating rod, and cam means mounted on said actuating rod and engagable with said one set of cam follower surfaces, respectively, for urging said doors to move about said hinges into engagement with said pig body when said chassis is disposed in said cavity.

9. The pig set forth in claim 8 wherein:

said actuating means includes plural sets of cam follower surfaces spaced apart on said doors, cam means engageable with respective sets of said cam follower surfaces and lost motion means interposed between said rod and said cams means respectively, to permit movement of said rod relative to at least one of said cam means whereby actuating forces are operable to urge each of said cam means into engagement with a set of said cam follower surfaces, respectively.

* * * * *

UNITED STATES PATENT AND TRADEMARK OFFICE
CERTIFICATE OF CORRECTION

PATENT NO. : 4,835,876

DATED : June 6, 1989

INVENTOR(S) : Steven G. Petermann, Michel L. Cabiran, John D. Cooper and Pedro F. Lara It is certified that error appears in the above-identified patent and that said Letters Patent is hereby corrected as shown below:

On the title page:

Add the name --- Pedro F. Lara, of Dallas, Texas --- as a co-inventor.

Column 7, line 22, delete "and".

Signed and Sealed this

Twenty-seventh Day of February, 1990

Attest:

JEFFREY M. SAMUELS

Attesting Officer     Acting Commissioner of Patents and Trademarks